United States Patent Office 2,943,051
Patented June 28, 1960

2,943,051

OIL BASE DRILLING FLUID

James L. Lummus, Tulsa, Okla., assignor to Pan American Petroleum Corporation, a corporation of Delaware No Drawing. Filed Aug. 2, 1956, Ser. No. 601,618

9 Claims. (Cl. 252—8.5)

This invention relates to the art of suitable fluids for drilling, completing and otherwise servicing wells. More particularly it relates to oil base drilling fluids which are stable to water contamination. This is a continuation-in-part of my copending U.S. patent application Serial Number 327,163, entitled Oil Base Drilling Fluid, filed December 20, 1952, now abandoned.

The art of oil base drilling fluids is confronted with a number of problems. A principal problem is the high cost of present commercial oil base drilling fluid. This high cost is due principally to the expense of treating the oil base with plastering agents to reduce the fluid loss, and with bodying agents to impart gel strength or viscosity sufficient to suspend weighting materials. Another problem is water contamination which appears to be unavoidable during drilling operations. This water can come either from formations drilled or from surface run-off and the like. Water contaminated drilling fluids are generally highly susceptible to shale contamination. That is, if the oil base contains water, this water tends to swell clay contacted by the drilling fluid, usually with the result that viscosity and sometimes gel strengths become excessive. Still another problem faced by the oil base drilling fluid art is that of increased fluid loss at high temperatures. This is due to the decreased effectiveness of most plastering agents, such as blown asphalt, at high temperatures. Gel strength is also a considerable problem in oil base drilling fluids. Many such fluids have no gel strength at all and thus, must relay on viscosity alone to carry bit cuttings from a well. Other oil base drilling fluids suffer from problems at the other extreme. That is, they have excessively high gel strengths, particularly when contaminated with water and hydratable shales. If a drilling fluid has little gel strength, a principal problem is to suspend weighting materials in this drilling fluid to increase the density to desired levels.

With the above problems and difficulties in mind, an object of this invention is to provide an improved low cost oil base drilling fluid. Another object is to provide an oil base drilling fluid which will withstand water and shale contamination. Still another object is to provide an oil base drilling fluid which has a low fluid loss rate even at high temperatures. An additional object is to provide an oil base drilling fluid having a gel strength within desirable limits. Another object is to provide an oil base drilling fluid in which weighting materials are easily suspended. A specific object is to provide a coated finely divided solid, resistant to water and having plastering and gel-forming properties when added to an oil base. Another specific object is to provide a method and composition for treating finely divided solids suspended in an oil base to disperse the particles and impart to the particles plastering and gel-forming properties and resistance to water contamination. A still more specific object is to provide a method and composition for stabilizing present oil base drilling fluids against water contamination.

In general, I accomplished the objects of my invention by coating finely divided solids with a combination of calcium chloride and lecithin or, in some cases, certain alternates of these materials. I have found that calcium chloride and lecithin appear to react to form a product which seems to retain the surface activity of lecithin so that the material tends to concentrate on surfaces of solids exposed to solutions or suspensions of the material. When the material is deposited on finely divided solids, the particles disperse readily in oil. The coated particles have been found to impart gel strength to the oil. The treated solids also have plastering properties which produce oil suspensions having low fluid loss. Being solids, the plastering materials are little affected by temperature. Therefore, temperature has little effect on properties such as fluid loss and gel strength. Thus, the simple and inexpensive coated particles are capable of performing the gel-forming and fluid loss reducing functions of the many and expensive additives used in prior compositions. In addition, the oil base drilling fluid, formed by a dispersion of these particles in oil, is stable at high temperatures and retains desirable properties when contaminated by large amounts of water and shale.

The coating also apparently is somewhat hydrophilic in nature since it acts as an effective emulsifying agent for contaminating water. In spite of this hydrophilic nature, however, the coating apparently is able to protect the solids completely from the water. For example, it has been found that even finely divided hydratable shales are protected from water by the composition and are suitable as finely divided solids for my purposes.

A coating of calcium chloride and lecithin is also effective in protecting hydrophilic solids in many of the presently available commercial oil base drilling fluids. Such materials are quick lime as in U.S. 2,356,776, Miller; alkali metal soaps as in U.S. 2,350,154, Dawson et al.; and U.S. 2,573,960, Fischer; or solids treated with surface active agents as described in co-pending U.S. patent application 144,856, filed February 17, 1950, now abandoned. Thus, when commercial oil base drilling fluids now available are treated with calcium chloride and lecithin, the hydrophilic solids are stabilized to water contamination amounting to as much as 40 percent of the resulting emulsion. When present oil base drilling fluids become contaminated with water, and hydratable shale is drilled, the shale particles produced by the bit often swell and thicken the drilling fluid excessively. The lecithin and calcium chloride apparently coat these shale particles, preventing shale hydration by the water. Thus, presently available commercial oil base drilling fluids are also protected against the adverse effects of shale contamination by my treatment.

The treatment is also capable of dispersing finely divided weighting materials, the settling rate of particles of weighting materials coated with calcium chloride and lecithin being about the same as in present commercial oil base drilling fluids, even though none of the usual additives for increasing gel strength and viscosity are employed with the coated particles. Therefore, weighting material such as ground limestone need only be stirred into an oil containing lecithin and calcium chloride whereupon, the weighting material becomes dispersed to act not only in its usual weighting capacity but also as a plastering agent and gel former.

The coating can be conveniently deposited on solid particles by simply stirring them into oil containing the treating agents, thus forming an oil base drilling fluid. For convenience in handling, it may often be desirable to coat the finely divided solid at a central plant and ship the coated material to the well for mixing into an oil base to form the drilling fluid. The coating need not be uniform since when the coated solid is dispersed in the oil base, some of the treating materials dissolve in the oil. From the oil solution a coating then is deposited over the previously uncovered portions of the solid particles. Thus, while it is possible to grind the solids with the liquid treating material to obtain a uniform coating of the liquid on the surfaces of the particles, it is satisfactory simply to stir into the liquid treating materials sufficient of a dry finely divided solid, such as ground oyster shells, to absorb the liquid and produce a drilling fluid additive sufficiently dry to be handled in paper bags. Since dry calcium chloride and other salts can be obtained in bags, it may be desirable to handle the salt in this readily available form, only the lecithin or other surface active agent being deposited on a solid carrier for convenient handling as a dry additive.

When reference is made to lecithin in this application, commercial lecithin is usually the material indicated. Commercial lecithin generally consists of only about one-third lecithin, one-third cephalin, another phosphatide, and one-third soybean oil employed as a solvent.

The term "lecithin" should not be restricted to this meaning, however, since lecithin in other forms is also suitable for my purposes. When a limitation to "commercial lecithin" is intended this term will be specifically used. The reaction product of commercial lecithin with aqueous calcium chloride solution appears to form over a wide range of calcium chloride to lecithin ratios. Usually, slightly more calcium chloride by weight than commercial lecithin is used since more calcium chloride than lecithin has been found desirable in drilling fluids. The reaction product is normally produced by simply stirring together commercial lecithin and a concentrated aqueous calcium chloride solution. The resultant product is a thick paste in which free water frequently is visible. This material can be employed as the additive. However, a thinner and more easily handled liquid product in which the water is stably dispersed is prepared by adding a little thin oil, such as No. 2 fuel oil, to the reaction product. About 2 percent by volume of fuel oil has been found sufficient to produce a thin easily handled product in which no free water is visible, particularly suitable for use in preparing or treating oil base drilling fluids. More fuel oil, for example about 10 percent by volume, may be employed if desired.

In discussing and claiming concenrates for use in preparing my oil base drilling fluid, it is convenient to use the term "consisting essentially of calcium chloride and lecithin." When this term is employed in connection with a composition, the term is intended to indicate a composition which may contain other ingredients, but which is free from materials which would destroy the effectiveness of either the calcium chloride or lecithin. For example, the composition may contain the cephalin and soybean oil normally associated with lecithin. The composition may also contain absorbent solids used to dry up the liquid product to form a solid concentrate or oil used to thin the product and form a liquid concentrate. Other inert solids and liquids may also be present. The composition should not, on the otoher hand, contain large amounts of materials such as sodium sulfate which might precipitate the calcium from solution, or powerful oxidizing agents such as potassium permanganate which might oxidize, and thus destroy the lecithin. Small quantities of even such contaminants may be present, however, so long as they do not render ineffective a substantial quantity of either the lecithin or calcium chloride or both.

The various aspects of the drilling fluid will now be considered in more detail.

OIL BASE

The oil may consist of any mineral, vegetable, or animal oil but the more viscous ones in general produce better gel strengths and lower fluid losses. Drilling fluids prepared with less viscous oils, on the other hand, can withstand more water contamination before viscosity and gel strengths become excessive. In general, for preparing oil base drill fluids, an oil with a viscosity in the range from about 2 to 200 centipoises should be selected. This includes most crude oils in the United States. If the crude oil is too thick, it can be cut back with a light oil such as kerosene in order to meet the initial viscosity requirements. If a fraction of crude petroleum is used as the oil base, an operable drilling fluid can be prepared even if the viscosity is as low as one or two centipoises. Solids tend to settle rather readily from such drilling fluids, however. In addition, if water is present, the water disperses into droplets upon mixing, but these droplets also settle rather rapidly leaving a layer of oil on top of the remaining emulsion. The droplets do not appear to coalesce seriously, however, so a very limited amount of stirring is adequate to redistribute them throughout the entire oil volume. While drilling fluids prepared from such low viscosity oils may be useful for some purposes such as workover and clean-out operations, it is generally advisable to use an oil having a viscosity of at least about 10 and preferably about 20 centipoises. This is particularly true of refined fractions of petroleum such as fuel oil, diesel oil, lubricating oil, or the like.

Most crude petroleum oils contain materials such as asphaltenes and the like which affect materially the properties of the final drilling fluid. Therefore, it is frequently possible to form drilling fluids having good properties with crude oils having viscosities somewhat below 10 centipoises. If a crude petroleum oil is to be used as the base oil in preparing a commercial batch of drilling fluid, it will be generally desirable to prepare a small pilot batch first to determine exactly what the final drilling fluid properties will be. If the final drilling fluid is too viscous, the crude petroleum should be diluted with a non-viscous oil before preparation of the principal batch. If the pilot batch has insufficient viscosity or gel strength, the crude petroleum oil should be diluted with a viscous oil, and possibly more calcium chloride and lecithin should be added.

To avoid fire hazards, it is usually desirable to observe a 120° F. minimum flash point limitation in selecting an oil base. Most crude oils will meet this limitation after a little weathering. In areas in which the crude oil will not meet the flash point specification after weathering, the crude oil can be topped to form a suitable oil base, or an oil with desirable characteristics can be brought in from other areas.

WATER CONTENT

The drilling fluid should contain at least a small amount of water. About ½ percent by volume of water should be present to dissolve some of the calcium chloride, or alternate salt, since it has been found that the salt is effective only when dissolved in water. It is usually convenient to introduce both the salt and water into the drilling fluid as a saturated solution of the salt in the water. It is possible, however, to add an excess of finely powdered solid salt to the oil and then add just enough water to dissolve the desired amount of salt. It is also possible for the drilling fluid to contain more than enough water to dissolve the salt and this condition frequently occurs due to water contamination from various sources. As previously mentioned, the treated solids have emulsifying properties which cause the water to be tightly held in a water-in-oil type emulsion. The water content of the emulsion may in most cases be as high as 30 percent by volume before the viscosity and gel strength exceed desirable limits of 250 centipoises for the viscosity, about 5 grams for initial gel strength and 20 grams for the ten minute gel strength, all measured at about 80° F. For drilling fluids with lower viscosities, that is, about 100 centipoises, the initial gel strength may be as high as about 10 or 15 grams and the 10 minute gel may be as high as 30 or 40 grams. If the drilling fluid is to be used in deep high temperature wells, the gel strengths can be 2 or 3 times the values given since the higher temperatures decrease the gel strength of the drilling fluid. With thicker oil, and with high concentrations of salts other than calcium chloride, the upper limit on water content may be as low as 20 percent by volume. By use of an oil having a viscosity below about 50 centipoises, it is possible to extend the water content to about 40 percent by volume before the viscosity and gel strength become excessive.

The distinction between water contaminated oil base drilling fluids on the one hand and emulsion drilling fluids on the other, is an entirely arbitrary matter. In the drilling fluid literature it has been customary by some authorities to draw the line at about 2 or 3 percent water. That is, oil base drilling fluids containing more than about 3 percent water have been defined as emulsion drilling fluids. This is a reasonable, although arbitrary, definition. However, it will be observed that my oil-base drilling fluids can contain up to about 40 percent by volume of water and still retain good drilling fluid properties. In order to claim conveniently my drilling fluid with water contents from about ½ up to about 40 percent, it has been found necessary to redefine the term "oil base drilling fluid" to include water contents much higher than normally considered proper. For purposes of this invention, the term "oil base drilling fluid" is arbitrarily defined as one containing up to about 40 percent by volume of an aqueous phase.

SOLIDS

The type of solids employed in my drilling fluid does not seem to be critical. A possible exception is soft materials such as blown asphalt which seem to act about the same way whether in the presence of lecithin and calcium chloride or not. Thus, these materials continue to reduce the fluid loss of oil base drilling fluids prepared with lecithin and calcium chloride. The principal limitation on the type of solids is the degree of fineness to which they are ground. When the term "finely divided solids" is employed, it will be understood that a single solid or mixture of solids is intended which has been ground until at least about 90 percent will pass a number 325 screen in the U.S. Standard Sieve Series (Fine Series). The term "solids" is not intended to include materials such as salts which are soluble in the water or oil present in my drilling fluid. The term is intended to include materials such as bentonite and sodium tallates which are merely dispersible, as well as solids such as ground oyster shells, barium sulfate, diatomaceous earth and the like. At least about 5 pounds per barrel of finely divided solids should be present in my drilling fluid, and preferably about 20 pounds per barrel, to bring the viscosity, gel strength and fluid loss into the desired ranges. As much as 200 pounds per barrel of coarsely ground hydratable shale has been added to an oil base drilling fluid prepared according to my invention without serious effects even though this drilling fluid was also contaminated with 30 percent by volume of fresh water. More than 100 pounds per barrel of weighting materials such as ground oyster shells or barium sulfate have been added to my drilling fluid without serious effect so long as sufficient coating chemicals were provided to coat the weighting material. In spite of the absence of the usual suspending agents, these weighting materials remained suspended in my drilling fluid as well as they do in the available commercial oil-base drilling fluids so long as an oil base having a viscosity of at least about 10 centipoises was used.

SURFACE ACTIVE AGENT

The discussion to this point has been limited to lecithin as the surface active agent. I have found that suitable alternates to lecithin are the ester-type non-ionic oil soluble surface active agents. For some purposes the ester-free ether-type non-ionic oil soluble surface active agents are also satisfactory alternates to lecithin. In general, the ester-type materials are esters of polyhydric alcohols with organic acids. The organic acid portion should contain at least 12, and preferably not more than about 20 carbon atoms per molecule. The polyhydric alcohols should be water soluble and, if they contain one or more polyoxyalkylene chains such as tetraoxyethylene, the total oxyethylene groups should not exceed about 4 in number to avoid excessive water solubility. Examples of suitable lecithin alternates of the ester type are Span 80, an anhydrosorbitol monooleate, and Pentamull 126, the mono ester of oleic acid and pentaerythritol. The materials are more completely described in my U.S. Patent 2,661,334. The ester-free, ether-type materials are, in general, ethers of an alcohol or mercaptan containing at least 12 carbon atoms per molecule with a polyglycol (frequently referred to as an oxyethylene chain) or polyglycerol containing not more than 4 glycol or glycerol units. An example of such materials is Antarox A–401, the tetraoxyethylene ether of nonyl phenol. The ester-free ether-type materials are more completely described in U.S. Patent 2,721,174. Although these alternates are satisfactory, lecithin is somewhat superior to most of them in that the fluid loss of drilling fluids prepared with lecithin is lower and the gel strength is higher than when most of the alternates are employed. Furthermore, lecithin is less expensive and a smaller quantity thereof is required. For these reasons, lecithin is greatly preferred as the surface active agent. The ester-type surface active agents are preferred to the ester-free ether-type since oil-base drilling fluids prepared with the latter type will not maintain more than about 10 percent by volume of water stably dispersed, larger amounts of water tending to separate from the oil and carry away a part of the calcium chloride or its alternates. So long as the water content can be maintained below about 10 percent, however, an oil-base drilling fluid with good properties can be prepared employing an ether-type material, such as the Antarox A–401 mentioned above, in place of lecithin. When the term "oil-soluble, non-ionic surface-active agent" is employed in this application the term is intended to include both the ester-type and ester-free ether-type of material. The class of surface active agents suitable for use in preparing drilling fluids containing more than about 10 percent water is more specifically defined to exclude the ester-free ether-type materials.

The concentration of the surface active agent should be between about one-half and about ten pounds per barrel, the lower amount being necessary to obtain an appreciable effect, and the higher limitation being imposed principally by economic considerations. The preferred range of concentration in oil base drilling fluids is between about 2 and 4 pounds per barrel. For oil bases having viscosities below about 10 centipoises, more solids and surface active agents, as well as more salt, should be employed to provide sufficient gel strength and to provide better fluid loss reduction. Although the above limitations should be observed in preparing an oil base drilling fluid competitive with those now available, it should be noted that a greatly improved workover drilling fluid can be prepared by adding smaller quantities of the surface active agent to the oil base.

SALT

The discussion relating to the types of salts used, to this point has been limited to calcium chloride. However, it has been found that other salts are effective as alternates to calcium chloride in preparing oil base drilling fluids with either lecithin or other surface active agents. In general, water soluble salts of alkali and alkaline earth metals are suitable. Examples include sodium or potassium chlorides, nitrates and sulfates, and magnesium or barium chlorides, nitrates and the like. All these salts appear to react to some degree with lecithin although none of them form as satisfactory a reaction product as calcium chloride for purposes of forming or treating oil base drilling fluids. Calcium chloride is also superior to its alternates in that drilling fluids prepared with this salt withstand contamination by more water, and have lower fluid losses than those prepared with the alternate salts. As noted later, only calcium chloride should be employed in treating presently available oil base drilling fluids.

METHODS OF PREPARATION

In preparing compositions falling within the scope of my invention, several methods may be employed. The simplest method is to react a saturated aqueous calcium chloride solution with commercial lecithin and add the product, preferably after mixture with a little thin oil, to the oil base. Finely divided solids, usually a weighting material, are then mixed in and the composition is ready for use. As previously mentioned, it is also possible to add the calcium chloride-lecithin reaction product to the surface of the finely divided solid material and then simply mix the coated solid into the oil base. Another method, which is particularly preferred if alternates to lecithin and calcium chloride are employed, is to mix a water solution of the salt into the oil base containing the surface active agent in solution. Solids are then added to this mixture.

If the invention is to be applied to one of the commercially available oil base drilling fluids, the addition of the calcium chloride-lecithin reaction product is highly convenient. However, it may be desirable to employ either of the constituents alone, calcium chloride being effective for reducing fluid loss, and lecithin being effective for reducing viscosity. A combination of lecithin and calcium chloride is necessary for giving protection against water and shale contamination.

TREATING PRESENT DRILLING FLUIDS

Considering in more detail the application of the invention to treating of commercial oil base drilling fluids, as previously mentioned, the treatment is particularly applicable to oil base drilling fluids containing hydrophilic solids. This term should be considered sufficiently broad to include materials which react chemically with water, for example, quicklime; materials which are highly dispersible in water, for example, sodium soaps of fatty acids; and materials which are swellable by water, for example, bentonite. A possible theory of the action of my treatment is that it produces a coating of calcium chloride and lecithin on the finely divided solid particles present in any oil base drilling fluid, so that a commercial drilling fluid treated with calcium chloride and lecithin actually becomes almost identical to one prepared by adding simply the lecithin and calcium chloride, together with an inexpensive finely divided solid, to an oil base. As noted in Example IV, however, salts other than calcium chloride do not afford a resistance to water contamination equivalent to that provided by the calcium chloride even in simple systems involving only oil, ground oyster shells, the salt and lecithin. The oil base drilling fluids now commercially available are rather complex mixtures in which it has been found that calcium chloride is unique in its ability to provide good resistance to water contamination in all of them. Some other salts are fairly effective in some cases, but calcium chloride is effective in all cases. As previously noted, the ester free ether-type oil soluble non-ionic surface active agents give stability to only a limited amount of water. Therefore, in treating presently available oil-base drilling fluids, the materials should be limited to calcium chloride as the salt, and to oil soluble non-ionic esters of polyhydric alcohols and acids having at least about 12 carbon atoms per molecule as the surface active agent.

Any amount of calcium chloride added to present commercial oil base drilling fluids helps to reduce the fluid loss and affords some protection to water contamination. However, a minimum of at least 2 pounds per barrel should be added to commercial oil base drilling fluids to obtain good fluid loss reduction and fair stability to water contamination. It has been found that more than 3 or 4 pounds per barrel of calcium chloride produces little additional effect and up to 10 pounds per barrel has been found to be relatively harmless except possibly for the rather high viscosity which results. The concentration of surface active agent to be employed in treating commercial oil base drilling fluids can be as low as a trace and still produce some beneficial effects. However, for good stability to water and shale, and for appreciable viscosity reduction, at least about 1 pound, and preferably about 3 or 4 pounds of surface active agent, preferably commercial lecithin, per barrel of drilling fluid should be added. As much as 10 pounds per barrel of commercial lecithin has been used without harmful effects. Accordingly, the upper limit on concentration of surface active agent apparently is principally economic in nature.

My invention will be more clearly understood by reference to the following examples. In all the data presented in these examples, fluid loss and viscosity were determined at 80° F. by the methods described in API Code No. 29, Second Edition, July 1942 (tentative). Fluid loss is in units of cc. of filtrate in 30 minutes. Viscosity is in units of centipoises. Gel strengths were measured by means of a Stormer viscosimeter and are given in terms of the number of grams which were required to cause the viscosimeter cup to start to turn immediately after stirring (initial) or after the drilling fluid had remained quiescent for 10 minutes (10 minute gel strength). Where the amount of water contamination is stated, the figure is in terms of percent by volume of the oil phase, not of the emulsion, unless otherwise indicated.

Example I

A series of drilling fluids was prepared containing various concentrations of commercial lecithin and calcium chloride. The oil base in every case was a West Texas crude oil from the Slaughter Field having a viscosity of 8 centipoises at 80° F. and a gravity of 32° API. The solid added was 20 pounds of ground oyster shells per barrel of uncontaminated drilling fluid, this limestone being ground so that at least 95 percent passed a 325 mesh screen. The calcium chloride was added in the form of a saturated solution, containing about 40 percent by weight calcium chloride. The concentration of the salt is presented in terms of percent by volume of the saturated salt solution, based on the oil, and also in terms of pounds of anhydrous calcium chloride per barrel of uncontaminated drilling fluid.

TABLE I

| CaCl² Percent Sat'd. Sol'n. | #/bbl. | Commercial Lecithin, #/bbl. | Water Contam., Percent | Viscosity, cpse. | Gel Str., Grams Initial | Gel Str., Grams 10 min. | Fluid Loss 80° F. | Fluid Loss 190° F. |
|---|---|---|---|---|---|---|---|---|
| 0 | 0 | 4 | None | 43 | 1 | 7 | 69 | |
| 1.5 | 3 | 4 | None | 40 | 0 | 1 | 5.5 | |
| 3 | 6 | 4 | None | 50 | 1 | 4 | 4 | 6.5 |
| 10 | 20 | 4 | None | 70 | 1 | 7 | 4 | |
| 25 | 50 | 4 | None | 135 | 1 | 10 | 4 | |
| 40 | 80 | 4 | None | 250 | 20 | 32 | 2.5 | |
| 3 | 6 | 0.5 | None | 35 | 0 | 1 | 5 | |
| | | | 40 | 125 | 1 | 3 | 0.5 | 4.5 |
| 3 | 6 | 2 | None | 41 | 0 | 1 | 5 | |
| | | | 40 | 150 | 1 | 3 | 0.5 | |
| | | | None | 50 | 1 | 4 | 4 | 6.5 |
| 3 | 6 | 4 | 5 | 54 | 1 | 4 | 4 | 6.5 |
| | | | 20 | 110 | 1 | 6 | 4 | |
| | | | 40 | 150 | 1 | 6 | 0.5 | 3.5 |
| 3 | 6 | 10 | None | 42 | 0 | 3 | 3.5 | |
| | | | 40 | 150 | 1 | 6 | 0.5 | |
| 1.5 | 3 | 0.5 | None | 36 | 0 | 1 | 8.5 | |
| | | | 40 | 112 | 0 | 1 | 1.5 | |
| 1.5 | 3 | 2 | None | 33 | 0 | 1 | 8.5 | |
| | | | 40 | 142 | 3 | 6 | 1.5 | |
| 1.5 | 3 | 4 | None | 30 | 0 | 1 | 5.5 | |
| | | | 40 | 140 | 3 | 6 | 1.5 | |
| 1.5 | 3 | 10 | None | 40 | 0 | 3 | 4.0 | |
| | | | 40 | 170 | 8 | 13 | 1.0 | |

It will be noted from the above table that as little as 1.5 percent saturated calcium chloride solution and 0.5 pound per barrel of commercial lecithin produces a very satisfactory drilling fluid. These lower values were selected as the lowest which could be accurately and conveniently handled in the laboratory. It is apparent that smaller quantities could be used in field operations. The most desirable concentrations seem to be about 3 percent saturated calcium chloride solution and about 4 pounds of commercial lecithin per barrel. The drilling fluid obviously withstood treatment by up to 50 pounds per barrel of calcium chloride and at least 10 pounds of commercial lecithin per barrel without difficulty.

Stability to at least 40 percent water contamination is well shown. It will be apparent that by limiting the amount of calcium chloride to about 10 or 20 pounds per barrel (5 or 10 percent by volume of a saturated aqueous solution), water contamination greatly exceeding 40 percent by volume of the uncontaminated drilling fluid can be tolerated. The water not only fails to affect properties adversely, but actually improves some properties such as fluid loss.

The stability of the drilling fluid to higher temperatures should be noted, particularly for drilling fluids uncontaminated by water. Even drilling fluids contaminated with water, however, do not have high fluid loss rates at elevated temperatures.

*Example II*

To determine the effect of using various oil bases, a series of drilling fluids was prepared using various oils. In all cases the treating chemicals were 3 percent by volume of a saturated aqueous solution of calcium chloride and 4 pounds of commercial lecithin per barrel of drilling fluid. Each drilling fluid contained 20 pounds per barrel of ground oyster shells prepared as described in Example I. The results are presented in Table II.

TABLE II

| Oil Base Field | Oil Base Area | Visc., cpse. | Grav., API | Added water, Percent By Vol. | Vis., cpse. | Gel Str., Grams Initial | Gel Str., Grams 10 min. | Fluid Loss 80° F. | Fluid Loss 190° F. |
|---|---|---|---|---|---|---|---|---|---|
| Little Buffalo Basin | Wyoming (15% fuel oil added). | 160 | 19.8 | None | 180 | 1 | 1 | 5.5 | 7.0 |
| Do | do | 160 | 19.8 | 40 | 250+ | 3 | 8 | 0.5 | |
| Sour Lake | Texas | 51 | 26.5 | None | 56 | 0 | 1 | 0.0 | 0.0 |
| Do | do | 51 | 26.5 | 40 | 105 | 1 | 1 | 0.0 | |
| Sholem Alechem | Oklahoma | 22 | 29.5 | None | 98 | 1 | 2 | 5.0 | 5.0 |
| Spindletop | Texas | 15 | 31.1 | None | 31 | 0 | 0 | 3.0 | 4.5 |
| Do | do | 15 | 31.1 | 40 | 80 | 0 | 1 | 3.5 | |
| Slaughter | do | 8 | 32.0 | None | 50 | 1 | 4 | 4.0 | 6.5 |
| Do | do | 8 | 32.0 | 40 | 150 | 1 | 6 | 0.5 | 3.5 |
| Fuel Oil | | 1 | 33.2 | None | 6 | 0 | 0 | 11.5 | |
| Do | | 1 | 33.2 | 40 | 13 | 0 | 0 | 10.0 | |
| Light Lubricating Oil | | 75 | | 62 | 250+ | 15 | 20 | 3.8 | |
| Do | | 52 | | None | 72 | 1 | 1 | 32.0 | |
| Do | | 52 | | 62 | 225 | 15 | 20 | 3.4 | |
| Do | | 45 | | None | 59 | 1 | 1 | | |
| Do | | 45 | | 62 | 190 | 12 | 14 | 3.9 | |

In the above table it will be observed that all oils tested produced satisfactory drilling fluids. All these drilling fluids, with one exception, also withstood contamination by water amounting to 40 percent by volume of the original drilling fluid. The exception is the drilling fluid using Little Buffalo Basin crude oil as a base. When a little more fuel oil was added to this contaminated drilling fluid to reduce the viscosity of the oil phase, the viscosity of the emulsion dropped down into an operable range below 250 centipoises. The stability to high temperature should also be noted. The drilling fluid prepared with fuel oil, while operable, permitted solids to settle to such an extent that frequent mixing was required. When water was added, the water dispersed into droplets, but these droplets settled, permitting a layer of oil to collect on top. The water droplets did not, however, tend to coalesce seriously, so a little mixing redistributed them throughout the oil phase. It will be noted that the more viscous light lubricating oil fractions with viscosities of 40 or 50 centipoises produced oil base drilling fluids with fluid losses which were rather high but still operable for many purposes. These drilling fluids could be diluted with 62 percent added water (38 percent of the total final volume) and still retain good properties. The gel strengths were a little high, but as previously noted, this is sometimes desirable for deep high temperature wells.

*Example III*

Three drilling fluids were prepared with surface active agents other than lecithin. In all cases the oil base was the West Texas crude oil described in Example I. The solids content consisted of 20 pounds of ground oyster shells per barrel, ground as described in Example I. The characteristics of these drilling fluids are presented in Table III together with data on one prepared with commercial lecithin for comparison. In every case 4 pounds of the surface active agent per barrel of drilling fluid were employed, together with 3 percent by volume of a saturated aqueous calcium chloride solution.

TABLE III

| Surface Active Agent | Added Water, Percent By Vol. | Visc., cpse. | Gel Strength, grams | | Fluid Loss, cc./30 min. at 80° F. |
|---|---|---|---|---|---|
| | | | Initial | 10 min. | |
| Commercial Lecithin | None | 50 | 1 | 4 | 4.0 |
| Do | 40 | 150 | 1 | 6 | 0.5 |
| Span 80 | None | 34 | 0 | 1 | 7.0 |
| Do | 40 | 130 | 1 | 3 | 0.5 |
| Pentamull 126 | None | 29 | 0 | 1 | 5.5 |
| Do | 40 | 160 | 1 | 10 | 1.0 |
| Antarox A-401 | None | 31 | 0 | 1 | 1.0 |
| Do | 40 | 67 | 1 | 1 | [1] 16.0 |

[1] 8.0 cc. of water separated from this filtrate.

Span 80 is anhydrosorbitol monooleate, Pentamull 126 is the mono ester of oleic acid and pentaerythritol, and Antarox A-401 is the tetraoxyethylene ether of nonyl phenol.

Oil base drilling fluids prepared with oil-soluble nonionic surface-active agents other than lecithin obviously have quite satisfactory characteristics, the lecithin preparations being somewhat superior in gel strength and fluid loss, and the ester-containing types being more stable to water contamination.

*Example IV*

Three drilling fluids were prepared employing salts other than calcium chloride. In all cases saturated solutions of the salts were employed, an amount being added equal to 3 percent by volume of the oil. The surface active agent was 4 pounds per barrel of commercial lecithin and the solids consisted of 20 pounds per barrel of ground oyster shells prepared as described in Example I. The properties of the drilling fluids are shown in Table IV. Properties of a drilling fluid employing calcium chloride as the salt are presented for comparison.

TABLE IV

| Salt | Added Water, Percent By Vol. | Visc., cpse. | Gel Strength, grams | | Fluid Loss | |
|---|---|---|---|---|---|---|
| | | | Initial | 10 min. | 80° F. | 190° F. |
| Calcium Chloride | None | 50 | 1 | 4 | 4.0 | 6.5 |
| Do | 40 | 150 | 1 | 6 | 0.5 | 3.5 |
| Sodium Chloride | None | 42 | 1 | 4 | 7.5 | 13.0 |
| Do | 40 | 170 | 10 | 20 | 2.0 | |
| Calcium Nitrate | None | 34 | 1 | 2 | 11.5 | 16.5 |
| Do | 40 | 170 | 9 | 29 | 1.5 | |
| Calcium Acetate | None | 42 | 1 | 6 | 18.0 | 21.5 |
| Do | 40 | 175 | 10 | 18 | 1.5 | |

According to these data, drilling fluids prepared with alternates to calcium chloride have operable characteristics, the only property in which improvement is desirable being a rather high fluid loss compared to the drilling fluid prepared with calcium chloride. The data show that calcium chloride is considerably superior not only in reducing fluid loss, but also in stabilizing the drilling fluid against water contamination. It will be noted that all the salts produce drilling fluids which are highly stable to heat.

*Example V*

Several drilling fluids were prepared with a number of solids in various concentrations. In all these tests, commercial lecithin was employed as the surface-active agent and calcium chloride as the salt. The oil base was the West Texas crude oil described in Example I except drilling fluids 16, 17, and 18 in which a crude oil from Sour Lake, Texas, was used as the oil base. The compositions and properties of these drilling fluids are indicated in Table V.

TABLE V

| No. | Solid | | Lecithin, #/bbl. | CaCl₂ Sol'n, percent by Vol. | Added Water, percent by Vol. | Visc., cpse. | Gel Str., Grams | | Fluid Loss, cc./30 min. at 80° F. |
|---|---|---|---|---|---|---|---|---|---|
| | Material | #/bbl. | | | | | Initial | 10 min. | |
| 1 | None | None | 2 | 1.5 | None | | | | 150 |
| 2 | Ground Shale | 20 | 2 | 1.5 | None | 33 | 0 | 1 | 28 |
| 3 | Oyster Shells | 20 | 2 | 1.5 | None | 142 | 3 | 6 | 5.5 |
| 4 | do | 20 | 2 | 1.5 | 40 | 28 | 0 | 0 | 1.5 |
| 5 | None | None | 4 | None | None | 43 | 1 | 7 | 140 |
| 6 | Oyster Shells | 20 | 4 | None | None | 48 | 1 | 4 | 69 |
| 7 | Aquagel | 20 | 4 | 3.0 | None | 54 | 1 | 4 | 7.0 |
| 8 | Oyster Shells | 20 | 4 | 3.0 | None | 150 | 1 | 6 | 4.0 |
| 9 | do | 20 | 4 | 3.0 | 40 | 130 | 3 | 12 | 0.5 |
| 10 | Oyster Shells and Shale Cuttings | {20 / 100} | 4 | 3.0 | 40 | 130 | 3 | 11 | 1.0 |
| 11 | do | {20 / 200} | 4 | 3.0 | 40 | 84 | 1 | 2 | 5.0 |
| 12 | Oyster Shells and Blown Asphalt | {20 / 30} | 4 | 3.0 | None | 71 | 1 | 3 | 0.0 (0.2 at 190° F.) |
| 13 | Oyster Shells | 20 | 4 | 6.0 | None | 93 | 1 | 1 | 4.5 |
| 14 | Drilling Fluid 13+110 lbs./bbl. Barium Sulfate | | | | | 112 | 1 | 1 | 6.0 |
| 15 | Drilling Fluid 14+2% fresh water | | | | | 45 | 1 | 1 | 2.0 |
| 16 | Oyster Shells | 20 | 4 | 6.0 | None | 57 | 1 | 1 | 0.0 |
| 17 | Drilling Fluid 16+110 lbs./bbl. Barium Sulfate | | | | | 51 | 1 | 1 | 0.0 |
| 18 | Drilling Fluid 17 heated to 300° F. at 4,000 p.s.i.g. pressure for 15 hours, cooled and stirred | | | | | | | | 0.0 |

The ground shale in the second drilling fluid was a hydratable shale, from the Texas Gulf of Mexico coastal area, ground until 90 percent passed a 325 mesh screen. The shale cuttings listed later were the same material much more coarsely ground to pass a 20 mesh screen so they would simulate fine bit cuttings occurring in drilling operations. The oyster shells were the same as described in Example I. Aquagel is a finely divided bentonite, of which 95 percent passes a 325 mesh screen and is obtainable from the Baroid Sales Division of the National Lead Company. The barium sulfate was ground to the same fineness as the Aquagel.

A comparison of the fluid loss obtained by use of shale ground until 90 percent passed a 325 mesh screen and oyster shells or bentonite ground until 95 percent passed a 325 mesh screen demonstrates the importance of using a finely divided solid if low fluid losses are to be obtained. The data regarding heavy contamination of a drilling fluid with shale cuttings shows that accumulation of bit cuttings during drilling operations will cause no difficulties even in the presence of large amounts of water. Drilling fluid number 12 was prepared to determine if blown asphalt would function as a fluid-loss reducer in the presence of the solid-coating materials of my invention. The data indicated that the blown asphalt continues to be effective. A comparison of drilling fluids 13 to 14 and of 16 to 17 demonstrate the ability of the drilling fluid to suspend weighting materials without adverse effects on its properties. Settling rates of the weighting materials were comparable to rates typical of present commercial oil base drilling fluids. The properties of drilling fluid 15 shows the ability of a little water to reduce the fluid loss of the weighted preparation. Finally, the properties of drilling fluid 18 demonstrate the stability of the drilling fluid at sustained high temperatures and pressures.

*Example VI*

Five commercial oil-base drilling fluids were prepared having approximately the following compositions, all parts being by weight unless otherwise indicated:

A. 200 parts of a 22.8 gravity Sholem-Alechem crude.
   120 parts of a bentonite wet with Sterox CD, a nonionic, water-soluble, surface active agent prepared by reacting about 10 moles of ethylene oxide with one mole of abietic acid or tall oil.
   190 parts of ground limestone.
   This composition was prepared according to copending application Ser. No. 144,856, Lummus et al.
B. 240 parts of stove oil.
   60 parts of ground limestone.
   30 parts of blown asphalt.
   20 parts of quicklime.
   5 parts of water.
   This composition was prepared according to U.S. Patent 2,356,776, Miller.
C. 200 parts of diesel oil.
   50 parts of blown asphalt.
   10 parts of sodium silicate.
   10 parts of tall oil.
   5 parts of water.
   This composition was prepared according to U.S. Patent 2,350,154, Dawson et al.
D. 1000 parts of 28 gravity crude oil from Velma Field in Oklahoma.
   135 parts of a concentrate made up of
      50 parts stove oil.
      50 parts potassium resinate.
      5 parts hydrated lime.
      10 parts water.
      5 parts ethylene glycol.
      15 parts bentonite.
   This composition was prepared according to U.S. Patent 2,573,960, Fischer.
E. Same as A except using the West Texas crude oil described in Example I as the oil base.

Properties of these drilling fluids with and without treatment with calcium chloride and lecithin, and with and without 40 percent water contamination are presented in Table VI. In every case the treatment was 2 pounds of commercial lecithin per barrel, and 1.5 percent of a saturated aqueous solution of calcium chloride. Water contamination in every case was 40 percent by volume of the oil.

TABLE VI

| Drilling Fluid | Treated | 40% Water Added | Visc., cpse. | Gel Strength | | Fluid Loss | |
|---|---|---|---|---|---|---|---|
| | | | | Initial | 10 min. | 80° F. | 190° F. |
| A | No | No | 180 | 1 | 4 | 0.0 | 4.5 |
| | No | Yes | 250+ | 2 | 8 | 0.0 | |
| | Yes | No | 180 | 1 | 3 | 0.0 | 1.2 |
| | Yes | Yes | 190 | 1 | 3 | 0.0 | |
| B | No | No | 80 | 1 | 3 | 0.0 | 4.3 |
| | No | Yes | 250+ | 2 | 10 | 0.0 | |
| | Yes | No | 90 | 1 | 5 | 0.0 | 0.0 |
| | Yes | Yes | 160 | 1 | 7 | 0.0 | |
| C | No | No | 63 | 1 | 1 | 1.0 | 6.6 |
| | No | Yes | 250+ | 11 | 33 | 1.0 | |
| | Yes | No | 66 | 0 | 2 | 0.5 | 1.0 |
| | Yes | Yes | 115 | 0 | 2 | 0.0 | |
| D | No | No | 250 | 0 | 0 | 1.5 | 72.0 |
| | No | Yes | 250+ | 2 | 10 | 0.0 | |
| | Yes | No | 250 | 0 | 3 | 0.0 | 0.5 |
| | Yes | Yes | 250 | 0 | 3 | 0.0 | |
| E | No | No | 60 | 0 | 0 | 19.0 | |
| | No | Yes | 250+ | 3 | 16 | | |
| | Yes | No | 120 | 2 | 5 | 1.0 | |
| | Yes | Yes | 178 | 2 | 5 | | |

The surprisingly complete stabilization to water contamination of the hydrophilic solids in all the above drilling fluids is to be noted. The viscosities remained within operable limits, and the gel strengths were almost entirely unaffected by the presence of water. The reduction of fluid loss at high temperature is probably due to the plastering effects of the solids coated with calcium chloride and lecithin.

It will be apparent from the above discussion and examples that I have provided a low cost oil base drilling fluid in which weighting material or other solids can be easily dispersed in the oil base to afford satisfactory plastering and gel strength properties. The drilling fluid withstands contamination by large quantities of water and shale. The fluid loss varies little with changes in temperature. The density of the drilling fluid can be easily increased by adding a finely divided weighting material which readily disperses in my drilling fluid. The invention has been shown to be applicable also to the treatment of existing oil base drilling fluids to stabilize these drilling fluids against the effects of high temperatures and of water and shale contamination.

Although several specific theories and examples are presented, it will be apparent to those skilled in the drilling fluid art, that many additional variations fall within the scope of my invention. Therefore, it is my intention to be limited not by these examples and theories but rather by the following claims.

I claim:
1. A composition for use in preparing or treating oil-base drilling fluids consisting essentially of calcium chloride and lecithin in which the ratio of calcium chloride to lecithin is in the range of 0.2/1 to 20/1.
2. The composition of claim 1 in which said lecithin is commercial lecithin.
3. The composition of claim 1 which includes in addition to the calcium chloride and lecithin sufficient finely divided solids to form a dry free-flowing powdery composition.
4. The composition of claim 3 in which said lecithin is commercial lecithin.
5. An oil base drilling fluid comprising an oil having a viscosity below about 200 centipoises, lecithin in a concentration between about ½ and about 10 pounds per barrel of drilling fluid, calcium chloride in a concentration between about ½ and about 80 pounds per barrel of drilling fluid, water in an amount between about ½ and about 40 percent by volume of said drilling fluid, and insufficient to produce a drilling fluid viscosity exceeding 250 centipoises, and a finely divided solid in a concentration of at least about 5 pounds per barrel of drilling fluid.
6. The drilling fluid of claim 5 in which said surface-active agent is commercial lecithin.

7. In the process of servicing a well the step of circulating in said well the drilling fluid defined by claim 5.

8. In the process of servicing a well the step of circulating in said well the drilling fluid defined by claim 6.

9. An improved oil base drilling fluid comprising an initial oil base drilling fluid containing a finely divided solid; water in an amount between about ½ and about 40 percent by volume of said improved oil base drilling fluid; calcium chloride in an amount between about 2 and about 10 pounds per barrel of said improved oil base drilling fluid; and commercial lecithin in an amount between about 1 and about 10 pounds per barrel of said improved oil base drilling fluid.

References Cited in the file of this patent

UNITED STATES PATENTS

| | | |
|---|---|---|
| 2,350,154 | Dawson | May 30, 1944 |
| 2,689,219 | Menaul | Sept. 14, 1954 |
| 2,739,120 | Fischer | Mar. 20, 1956 |
| 2,772,073 | Johnson | Nov. 27, 1956 |